April 16, 1968  E. SCHWEITZER  3,378,707
STEP MOTOR INCLUDING A U-SHAPED CORE WITH ALTERNATELY
ENERGIZABLE FIELD WINDINGS THEREON
Filed Jan. 7, 1965

INVENTOR.
EUGEN SCHWEITZER
BY
Woodhams, Blanchard & Flynn
ATTORNEYS

United States Patent Office 3,378,707
Patented Apr. 16, 1968

3,378,707
STEP MOTOR INCLUDING A U-SHAPED CORE WITH ALTERNATELY ENERGIZABLE FIELD WINDINGS THEREON
Eugen Schweitzer, Munich, Germany, assignor to Movit Industrieanstalt, Schaan, Liechtenstein, a corporation of Liechtenstein
Filed Jan. 7, 1965, Ser. No. 424,048
Claims priority, application Germany, Jan. 22, 1964, M 59,640
14 Claims. (Cl. 310—49)

ABSTRACT OF THE DISCLOSURE

A step motor having a toothed rotor supported on a rotatable axis within a rotor housing and a stator which is provided with at least two alternately excitable field windings carried by magnetic cores. The magnetic cores are held in contact at one end thereof with radially arranged pole shoes, which pole shoes comprise a portion of the rotor housing and are spaced around the periphery of the rotor with the pole shoes associated with one field winding being displaced approximately a half tooth spacing relative to the pole shoes associated with the other field winding.

---

This invention relates to a step motor with a toothed rotor supported on a rotative axis and a stator which is provided with at least two alternatingly excitable field windings, said field windings being carried by magnetic cores. Said cores are at one end thereof in contact with radially arranged pole shoes, said pole shoes being spaced around the perimeter of the rotor and being displaced with respect to the field winding toward each other about a half rotor tooth spacing.

Step motors have a wide field of use. They serve, for example, as drives for counting devices for the counting of electrical impulses, such as in telephone technology, in calculating or other office machines or in other similar uses. A further example of use is the driving of information carriers as in perforated tapes or magnetic tapes which are passed stepwise through a computer. Finally the use of a step motor in control systems may be mentioned in which the step motors release a number of switching circuits one after another. In all these and further not mentioned cases where step motors may be used, the step motors operate closely with other apparatus. This raises a number of problems which in known step motors are not fully satisfied.

A step motor must be connected to the apparatus which it is supposed to drive by force transmitting means which has as small as possible dimension and a small mass. This is necessary in order to prevent oscillation of the force transmitting means and to hold to a minimum its inertia.

The step motor must in addition itself be as small as possible in order that it can be built into the apparatus being driven with a minimum of space being required therefor.

The step motor should be simple in construction so that even in a long period of use both its susceptibility to trouble and its manufacturing cost will remain small. The minimizing of its susceptibility to trouble is especially important since the failure of the step motor causes in turn the stopping of very expensive apparatus and often entire installations with corresponding large economic loss.

Further, a step motor should exert no disturbing influence on the driven apparatus. This danger occurs particularly with electrical apparatus which can be adversely influenced by the magnetic field of the motor.

Finally, a step motor should be adaptable to the largest possible number of different kinds of apparatus without other than minor alterations in order that, with a small number of designs, a large number of use situations can be accommodated. In this connection, it is necessary that the range of available step frequencies is as great as possible.

The step motor of the present invention possesses the above-desired advantages while not possessing the disadvantages of the known step motors discussed below.

In certain known step motors, the field windings lie with the magnetic core alongside of the rotor. When the shaft of the apparatus to be driven is parallel to the rotative axis of the rotor, as is usually the case, then the force transfer means must extend over a substantial distance and in such case the force transfer means is of a correspondingly large size and of considerable inertia. Thus, the step motor itself in this situation is rather large. Thus, neither of the initial above-named requirements are met. Further, it is in the known arrangements difficult to obtain adequate magnetic shielding at the outside without the necessity of accepting at the same time a further increase in the dimensions of the step motor.

Step motors are also known in which contrasting to that mentioned above, the magnetic core lies opposite the field windings with reference to the rotor axis or in which the magnet arms branch off in the direction of the rotor axis from the end of the magnetic core remote from the axis, said magnet arms extending toward poles positioned at the side faces of the rotor. In this manner there is obtained a flatter motor, which is nevertheless broader in a plane crosswise to the rotor axis, said motor only being connectible to a shaft to be driven if sufficient space is available at both sides of the location. In this previously known motor, an axial friction brake is applied through the poles which are positioned adjacent the side faces of the rotor.

Finally, there has previously been suggested a step motor in which to increase the braking friction in the bearings of the rotor axle, the two magnet cores are arranged adjacent each other on the same side of the field windings with respect to the rotor axis but are nevertheless positioned lengthwise of said axis. This motor is long in an axial direction and substantially stresses its rotor bearings in a radial direction. No oil reaches this location so that the bearings wear excessively on one side. In view of the small restraining air gaps the motor becomes practically unuseable after a few times of operation.

The present invention relates basically to the problem of a step motor of the first described class, namely one having pole shoes spaced solely radially around the circumference of the rotor, which is so constructed that it fulfills the greatest possible number of the above set forth requirements. This will be accomplished according to the invention in that the magnet cores are arranged with the field windings on the same side of a plane passing lengthwise along rotor axis. The field windings and magnet cores are aligned crosswise with respect to the rotor axis and are closely adjacent. The magnet cores are connected with pole shoes located on the other side of said plane by magnet arms overlapping the rotor.

Further features, details and advantages of the invention will appear from the following description, in connection with the drawings, of an embodiment of a step motor made according to the present invention. In the drawings, there is shown:

FIGURE 1, a side view of a step motor according to the invention;

FIGURE 2, a front view of the motor of FIGURE 1 taken in the direction of the arrow II in FIGURE 1;

FIGURE 3, a view of the motor of FIGURE 1 with the clamp band removed and without connecting terminals;

Figure 6:
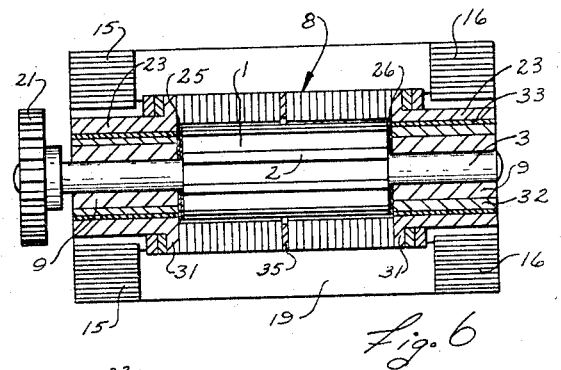
FIGURE 6 is an enlarged partial cross-section view taken on the line VI—VI of FIGURE 3.

The step motor as set forth in the drawings comprises a rotor 1 (FIGURES 4 and 6) with pole teeth 2, said pole teeth in the illustrated embodiment being ten in number. The rotor 1 is mounted on the axle 3 and is surrounded by pole shoes 4, 4', 5 and 5' which are arranged at intervals around the circumference of the rotor. The pole shoes are, in the illustated embodiment, constructed as double shoes whose segments are separated from each other by the recesses 6–7 facing the rotor. In this manner, each pole shoe affects two teeth 2 of the rotor 1. As shown particularly in FIGURE 4, a small space is located between the circumference of the rotor 1 and the pole shoe segments which narrows in the direction of rotation A of the rotor. The associated pole shoes 4–4' are displaced from the further mutually associated pole shoes 5–5' in their circumferential proximity to the nearest rotor tooth by half the spacing between the adjacent rotor teeth. As shown in FIGURE 6, the rotor is, in the particularly advantageous illustrated example, arranged in a housing 8, said housing having support bearings 9 for the rotatable axle 3 of the rotor and mounting the pole shoes therein. The housing will be further described below.

Figure 3:
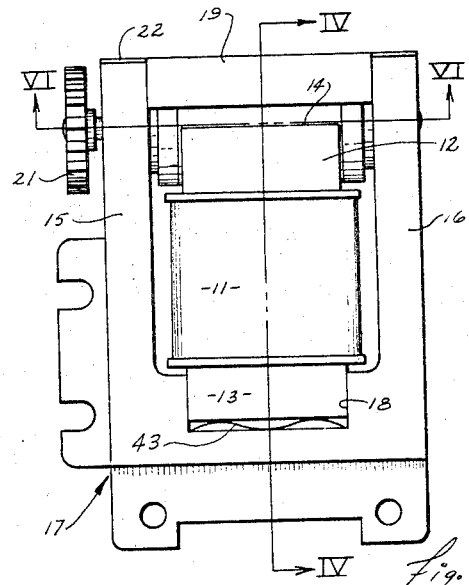
Figure 5:
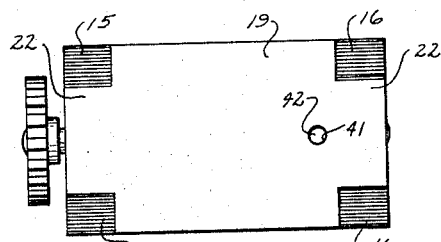
FIGURE 5 is a top view of the motor as illustrated in FIGURE 3 with the clamp band removed.
Figure 4:
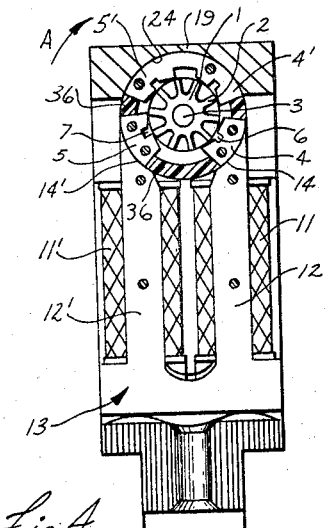
FIGURE 4 is a cross-section through the motor of FIGURE 3 corresponding to line IV—IV.

The rotor 1 is located adjacent a stator having two field windings 11–11' (FIGURES 3 and 4). The field windings are supported by magnet cores 12–12' which are provided by the arms of a U-shaped core body 13. The magnet cores 12–12' lie with their free ends closely adjacent the pole shoes 4–5. The upper ends of the magnetic cores 12–12' have an arcuate configuration 14–14' thereon so as to form a recess which is in the form of intermittent cylindrical jacket sections. The cylindrical rotor housing 8 is adapted to be received within the recess formed by the arcuate sections 14–14'. The recess formed by the arcuate sections 14–14' is somewhat less wide than the rotor housing 8 adapted to be received therein so that upon insertion of the rotor housing, the U-arm magnetic cores 12–12' are sprung somewhat apart so that the rotor housing 8 is held fast by being clamped therebetween. In this manner, the pole shoes 4–5 are held in snug engagement with the magnetic cores 12–12', respectively.

The pole shoes 4' and 5', which are adjacent and overlie the rotor axle 3, are connected to the magnet cores 12–12' by magnet arms 15–16 together with a top magnet plate 19 which is positioned above the rotor housing. The magnet arms 15–16 are positioned at opposite ends of the core body 13 and run subsequently perpendicular to and toward the rotor 3. The magnet arms 15–16 constitute the arms of a U-shaped arm body 17 whose web portion contains a cavity 18 into which the core body 13 is closely inserted in a manner illustrated in FIGURE 3, said core body 13 being positioned at a ninety-degree angle with respect to the arm body 17.

As the drawing shows, the field windings 11–11' lie, as a result of the described arrangement, close to each other with the mutually related magnet cores 12–12' substantially perpendicular to the rotor axle 3 and on the same side of a horizontal plane lying diametrally of the rotor axle 3 as shown in the drawings. The magnet arms 15–16 engage the rotor housing 8 by means of the magnet plate 19 mounted on the upper side of the rotor, as will be described further hereinafter. This arrangement makes it possible for the step motor to closely approach on three sides (left, right and upper in the drawing) a driven shaft, not shown, or other apparatus which is to be driven in a stepwise manner by the motor embodying the invention. This driven shaft can be driven by a gear 21 mounted on the rotor axle 3 wherein, as a rule, the mechanism requires only one further gear or when pulleys are used rather than gears, only a short belt. This follows from the fact that the spacing of the rotor axle 3 from the shaft to be driven is very small.

The magnet arms 15–16 are constructed in the shape of a fork (see FIGURE 2) at their upper ends. Upon the entry of the rotor housing 8 into the recesses 14–14', the ends 23 of the housing 8 are loosely received within the slot in the forked ends of the magnet arms 15–16. The magnet plate 19 includes axially extending projections 22. Further, the underside of the magnet plate 19 has cylindrical recess 24 therein which conforms to the contour of the rotor housing 8. Upon placing the magnet plate 19 in position, the rotor housing 8 is snugly received in the recess 24 with the pole shoes 4'–5' being in snug engagement with the plate 19. Similarly, the projections 22 are snugly received within the slots in the forked ends of the magnet arms 15–16. The projections 22 are so dimensioned that there is provided a narrow contact area between the forks and the projections whereby a good magnetic conduction is assured between the magnet arms 15–16 and the magnet plate 19.

In order to maintain the rotor housing 8 properly positioned with respect to the magnetic plate 19 and the magnetic cores 12–12', the magnetic plate 19 is provided with a small opening 41 therethrough, which opening is aligned with a similar opening or bore formed in the rotor housing 8 when the housing is properly rotatably positioned with respect to the magnetic plate 19. A lock pin 42 is then inserted into the aligned openings so as to prevent relative rotation between the rotor housing and the magnetic plate 19.

The entire assembly is held together by a clamp band 26 made from a magnetic material, which clamp band 26 is of an essentially U-formed shape. The free arms of the clamp band are fastened by means of lateral bolts 27 which pass through the web of the arm body 17. The clamp band 26 is arranged around the entire step motor and lies at its upper side on the upper surface of the magnet plate 19, which in turn projects somewhat upwardly above the magnet arms 15–16. The magnet plate 19 is thereby pressed fixedly against the pole shoes 4'–5' and the rotor housing is thereby prevented from escaping upwardly out of the recess 14–14'. Holding together of this assembly will be improved by using a pressure spring 43 which is inserted underneath the core body 13 within the cavity 18 and presses the surfaces of the parts 12, 12', 8, 19 and 26 together.

Figure 1:
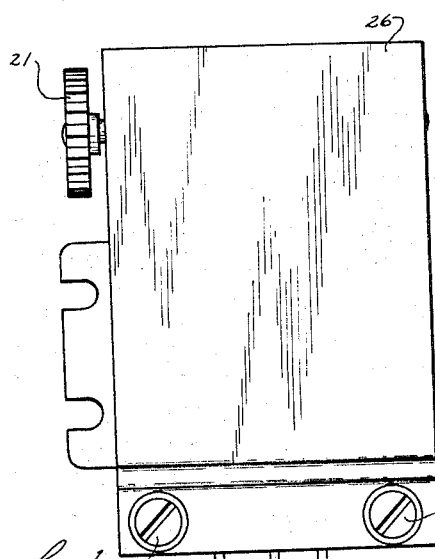
Figure 2:
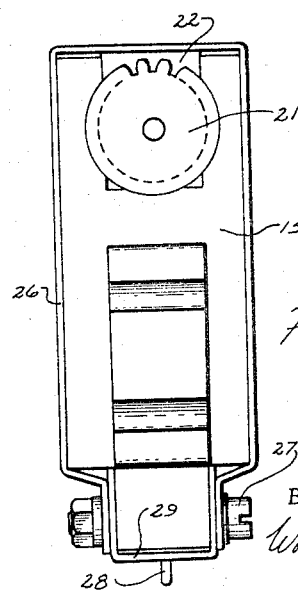

A complete external magnetic protection is assured in that the magnetic arms 15–16, as set forth in FIGURE 2, extend crosswise over the entire width of the step motor S, while the clamp band 26 as in the manner illustrated in FIGURE 1 entirely covers the motor laterally in the direction of the rotor axle 3. Further, the magnet plate 19 extends likewise over the entire top width of the motor while a bottom closure is provided by the webs of the core body 13 and the arm body 17. Thus, in this manner, the outward radiation of the magnetic field is prevented. Further, penetration of strange magnetic fields into the inside of the motor is also prevented.

The electrical connections to the field windings 11–11' are connected as at 28 to a terminal unit 29 which is fastened by the bolt 27 to the clamp band 26 laterally of the arm body 17.

As is shown in FIGURES 4 and 6, the rotor housing 8 in the above-described embodiment of the invention includes two cylindrical bearing holders 23 which consist of non-magnetizable material such as brass and include the radially outwardly extending flanges 31 at their adjacent ends. The bearings 9 for the rotor axle 3 are advantageously mounted in these flanged bearing holders. The cylindrically formed bearings 9 are for this purpose each disposed in a cylindrical bushing 32 which is made out of non-magnetizable material and is respectively mounted within the bearing holder 23 related thereto by a layer 33 of non-magnetized material. Through such mounting of the bearing 9, an excellent and simple adjustment of the rotor with respect to the pole shoes is obtained.

The pole shoes 4, 4′ 5, and 5′ are inserted between the flanges 31 of the bearing mounts 23. The axial connection of the rotor housings 8 is accomplished by lengthwise arranged tie bars (not shown) which, for example, are constructed as rivets. The pole shoes, as well as the core bodies and the arm bodies, consist advantageously of layers of sheet iron in order to hold at a minimum of losses in flux flow. The pole shoes can be divided in the axial direction by a protective disk 35 for improving their rigidity.

In a circumferential direction of the rotor housing 8, the spaces between the pole shoes are advantageously tightly sealed by non-magnetizable material, particularly by little plastic blocks 36 in the shape of sectors of a hollow cylinder.

It is particularly advantageous if the pole shoes arranged with respect to different field windings, for example, pole shoes 4′–5′ are fastened together as a single part in the manner set forth in FIGURE 4. The magnetic plate 19 is then laid onto this common pole shoe whereupon there is obtained a much better magnetic flow from the magnet arms 15–16 out to the pole shoes 4′–5′.

The bearings 9 are advantageously made as a special, particularly coarse, sintered bearing.

The general manner of operation of the described step motor is well known. By alternately energizing the field windings 11–11′, the rotor is advanced a half-tooth space at a time.

Between each of the flat ends of the rotor 1 and the respective bearings 9, there may desirably be arranged two disks 38–39 which have flat upper surfaces and consist of a relatively flexible material, for example, a plastic. The disk 38 bears during each operational period firmly against the flat side of the bearing housing while the respectively associated disk 39 lies against the opposed surface of the rotor. In this manner, there is provided an axial sliding bearing without which a very exacting flat machining of the rotor and the bearing housings, especially a deburring of the rotor, would be necessary.

All of the features including the construction details which appear in the drawings and specification can within the scope of the invention be arranged in a variety of other combinations.

The embodiments of the invention in which an exclusive property or privilege is claimed are defined as follows:

1. A step motor, comprising in combination:
   a toothed rotor;
   a housing mounting said rotor for rotation about the longitudinal axis thereof;
   a stator having at least two alternately energizable field windings, said field windings being mounted on magnetic cores;
   said magnetic cores and said field windings being positioned on one side of a plane containing the rotor axis with the magnetic cores being positioned closely adjacent each other in a direction substantially transverse to the rotor axis;
   a first pair of stationary pole shoes spaced around the circumference of the rotor with one shoe of said pair being positioned on said one side of said plane, the other shoe of said pair being positioned on the other side of said plane, said one pole shoe being connected to one of said magnetic cores;
   a second pair of stationary pole shoes spaced around the circumference of the rotor with one shoe of said pair being positioned on said one side of said plane, the other shoe of said pair being positioned on said other side of said plane, said one pole shoe being connected to the other said magnetic core;
   said first and second pair of pole shoes being circumferentially spaced relative to the nearest rotor tooth by a distance approximately equal to one half the spacing between adjacent rotor teeth; and
   magnetic arm means interconnecting said magnetic cores with said pole shoes located on the other side of said plane.

2. Step motor according to claim 1 wherein the magnetic cores comprise a common U-shaped core body whose arms carry the field windings.

3. Step motor according to claim 1 wherein the arm means comprises a common U-shaped arm body.

4. Step motor according to claim 1 wherein the magnetic cores comprise arms of a U-shaped core body, said arm means comprising a pair of magnetic arms connected by a web portion to define a U-shaped arm body with the core body being positioned at an angle of about 90 degrees with respect to the arm body, said core body being disposed between said magnetic arms and atop said web.

5. Step motor according to claim 1 wherein the rotor is arranged in a single rotor housing and wherein the pole shoes are separable from the magnetic cores and said arm means comprise a part of the wall of the rotor housing.

6. Step motor according to claim 5 wherein the magnetic cores comprise a U-shaped core body, the U-arms of the core body providing at its free end a recess in which the rotor housing is received, the ends of the U-arms lying fixedly against the respective pole shoes.

7. Step motor according to claim 6 wherein said arm means comprises a magnetic plate positioned on the rotor housing at the side thereof lying oppositely to the recess, said arm means further comprising a pair of magnetic arms spaced from each other on the side of said rotor axis lying opposite said magnetic cores, said magnetic plate being connected to said spaced arms, the magnetic plate at its lower side being shaped corresponding to and in engagement with the respective pole shoes of the rotor housing, and clamp means for holding said magnetic plate in engagement with the rotor housing.

8. Step motor according to claim 7 wherein the magnetic arms are constructed in a fork shape at their free ends and wherein the ends of the rotor housing together with projections of the magnetic plate are moveable into the forks from the open side thereof.

9. Step motor according to claim 7 wherein the magnetic arms are connected by a web portion to define a U-shaped arm body with the magnetic arms being at least as wide as the core body with the field windings thereon to thereby provide a magnetic protection along the axial direction of the rotor;
   magnetizable clamp means fully laterally covering the core body, the field windings and the rotor housing, said clamp means being fastened to the web portion of the arm body to laterally provide a magnetizable protection;
   the magnetic plate together with the clamp means fully covering the rotor housing at the upper side thereof and providing an upper magnetic protection.

10. Step motor according to claim 4 wherein a compression spring is inserted between the web of the core body and the respective arm body.

11. Step motor according to claim 5 wherein the rotor housing has bearing means at opposite ends thereof for rotatably supporting the rotor, said bearing means including nonmagnetizable bearing holders containing bearings therein, said pole shoes being positioned axially between said bearing holders.

12. Step motor according to claim 5 wherein said pole shoes positioned on said other side of said plane are fastened together as a single part.

13. Step motor according to claim 5 wherein the rotor housing is substantially cylindrical with said pole shoes comprising a portion of the wall thereof, the remaining portions of the wall between the pole shoes being a non-magnetizable material.

14. Step motor according to claim 6 wherein the arm body has a web having terminal means thereon for the energizing and de-energizing of the field windings.

No references cited.

ORIS L. RADER, *Primary Examiner.*

J. W. GIBBS, G. R. SIMMONS, *Assistant Examiners.*